US008903907B2

(12) United States Patent
Itaba et al.

(10) Patent No.: US 8,903,907 B2
(45) Date of Patent: Dec. 2, 2014

(54) RELATIONSHIP SUPPORT APPARATUS, RELATIONSHIP SUPPORT METHOD, AND STORAGE MEDIUM

(75) Inventors: Masahiro Itaba, Tokyo (JP); Noriaki Kawahara, Tokyo (JP); Yuji Tomita, Tokyo (JP)

(73) Assignee: Rakuten, Inc., Tokyo (JP)

( * ) Notice: Subject to any disclaimer, the term of this patent is extended or adjusted under 35 U.S.C. 154(b) by 161 days.

(21) Appl. No.: 13/172,338

(22) Filed: Jun. 29, 2011

(65) Prior Publication Data
US 2012/0005272 A1    Jan. 5, 2012

(30) Foreign Application Priority Data

Jun. 30, 2010   (JP) .................................. 2010-150619

(51) Int. Cl.
*G06F 15/16* (2006.01)
*G06Q 10/10* (2012.01)

(52) U.S. Cl.
CPC ..................................... *G06Q 10/10* (2013.01)
USPC .......................................... 709/204; 709/202

(58) Field of Classification Search
CPC .............................. G06Q 50/01; H04L 67/306
USPC ................................................. 709/204, 202
See application file for complete search history.

(56) References Cited

U.S. PATENT DOCUMENTS

2003/0191673 A1* 10/2003 Cohen ................................ 705/5
2005/0086211 A1* 4/2005 Mayer ................................ 707/3
2006/0059159 A1* 3/2006 Truong et al. .................... 707/10
2008/0073802 A1* 3/2008 Anderson et al. ............. 261/118
2010/0145869 A1* 6/2010 Brown ........................... 705/319

FOREIGN PATENT DOCUMENTS

JP   2005-158021 A      6/2005
JP   2005158021 A   *   6/2005
JP   2010-86214 A       4/2010

OTHER PUBLICATIONS

Japanese Office Action dated Dec. 3, 2013, issued in corresponding Japanese Patent Application No. 2010-150619.

* cited by examiner

*Primary Examiner* — Nicholas Taylor
(74) *Attorney, Agent, or Firm* — Sughrue Mion, PLLC

(57) ABSTRACT

Provided is a relationship support apparatus capable of preventing a user from inconsistently applying for relationships. An receiving section (32) receives an input of identification information of a desired relationship partner user, and further receives an input of identification information of the relationship-seeking user. A determination section (38) determines, based on the identification information of the relationship-seeking user and the identification information of the desired relationship partner user, whether or not an agreement has been reached on the relationship between the relationship-seeking user and the desired relationship partner user. A suspension section (40) suspends, based on a result of the determining performed by the determination section (38), the relationship-seeking user and the desired relationship partner user from carrying out a relationship-seeking activity with respect to another user.

7 Claims, 7 Drawing Sheets

FIG.5

| USER ID | NAME DATA | SEX DATA | AGE DATA | ADDRESS DATA | TELEPHONE NUMBER DATA | E-MAIL ADDRESS DATA | RELATIONSHIP-SEEKING ACTIVITY MODE DATA | DESIRED RELATIONSHIP PARTNER USER ID |
|---|---|---|---|---|---|---|---|---|
| 0001 | USER A | MALE | 36 | TOKYO···· | 03-···· | a@aaa.aa | ACTIVE | |
| 0002 | USER B | FEMALE | 33 | KANAGAWA··· | 045-···· | b@bbb.bb | ACTIVE | |
| 0003 | USER C | MALE | 45 | OSAKA···· | 06-···· | c@ccc.cc | ACTIVE | |

| USER ID | NAME DATA | SEX DATA | AGE DATA | ADDRESS DATA | TELEPHONE NUMBER DATA | E-MAIL ADDRESS DATA | RELATIONSHIP-SEEKING ACTIVITY MODE DATA | DESIRED RELATIONSHIP PARTNER USER ID |
|---|---|---|---|---|---|---|---|---|
| 0001 | USER A | MALE | 36 | TOKYO······ | 03–······ | a@aaa.aa | SUSPENDED | 0002 |
| 0002 | USER B | FEMALE | 33 | KANAGAWA·· | 045–······ | b@bbb.bb | SUSPENDED | 0001 |
| 0003 | USER C | MALE | 45 | OSAKA······ | 06–······ | c@ccc.cc | ACTIVE | |

50

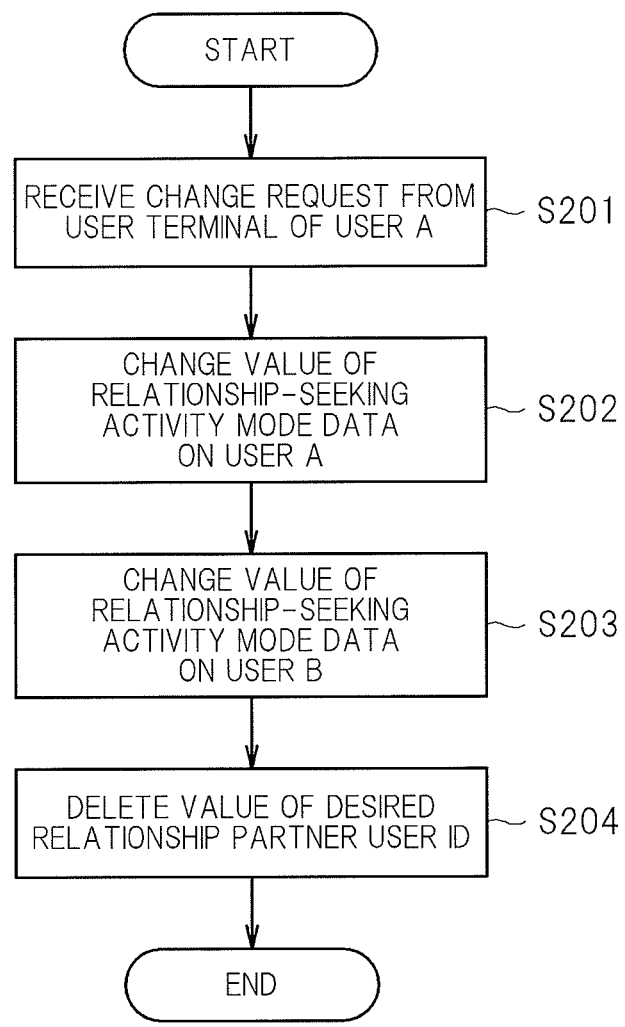

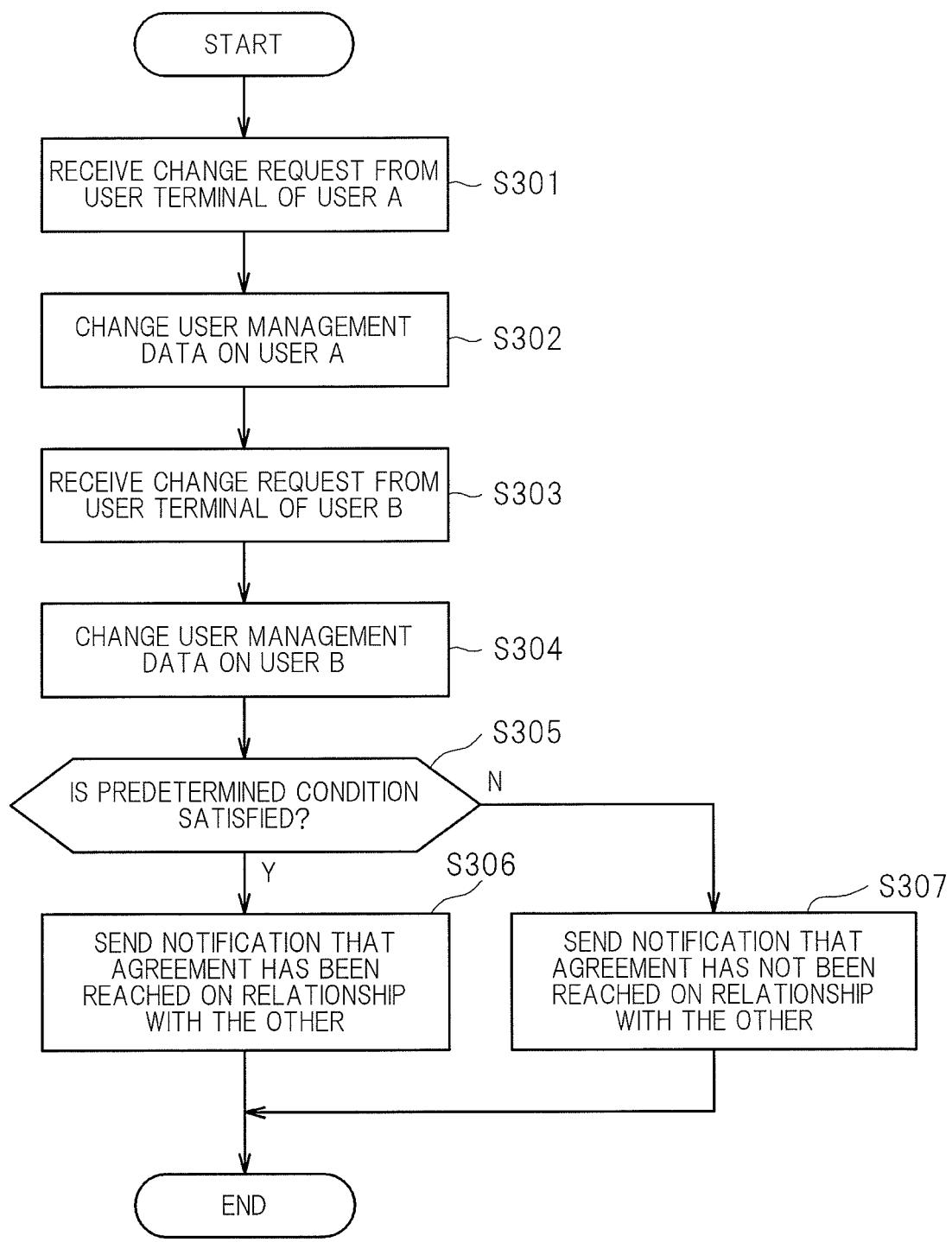

US 8,903,907 B2

RELATIONSHIP SUPPORT APPARATUS, RELATIONSHIP SUPPORT METHOD, AND STORAGE MEDIUM

CROSS-REFERENCE TO RELATED APPLICATIONS

The present application claims priority from Japanese application JP 2010-150619 filed on Jun. 30, 2010, the content of which is hereby incorporated by reference into this application.

BACKGROUND OF THE INVENTION

1. Field of the Invention

The present invention relates to a relationship support apparatus, a relationship support method, and a storage medium.

2. Description of the Related Art

In recent years, a relationship support business for supporting men and women in seeking a relationship therebetween has been expanded by use of the Internet. A relationship support system used in the relationship support business is equipped with a search function useful for finding someone of the opposite sex that one likes, an opposite-sex partner recommendation function of referring a user who seeks a relationship with someone of the opposite sex to a person of the opposite sex determined to be suitable as the user's relationship partner, and other such functions. The relationship support system is provided with various ideas for promoting the use made by users.

Japanese Patent Application Laid-open No. 2010-86214 discloses a technology in which a blurred image of an applicant who applies for a relationship is presented to the other person, it is verified whether or not the other person accepts the image exchange application, and if it is verified that the application is accepted, a higher-definition image of the other person than a blurred image of the other person is presented to the applicant while a higher-definition image of the applicant than the blurred image of the applicant is presented to the other person. According to the technology disclosed in Japanese Patent Application Laid-open No. 2010-86214, it is less likely that an individual is identified by an indefinite person viewing the image one-sidedly, which can promote the use of the system.

SUMMARY OF THE INVENTION

However, the system according to Japanese Patent Application Laid-open No. 2010-86214 raises a problem that it is possible to inconsistently apply for relationships to an indefinite number of users. In the relationship support system utilizing the Internet, communications between users are generally performed via a network, and hence it is actually difficult to understand each other's identity sufficiently. If the users of the relationship support system include such an inconsistent user as to apply for relationships to an indefinite number of users, the credibility of the relationship support business may be damaged, and the expansion of the relationship support business may be hindered.

The present invention has been made in view of the above-mentioned problem, and an object thereof is to provide a relationship support apparatus, a relationship support method, a program, and a storage medium which are capable of preventing a user from inconsistently applying for relationships.

In order to solve the above-mentioned problem, the present invention provides a relationship support apparatus, in which information of a plurality of users looking for a relationship partner is registered, which supports the plurality of users in seeking an opportunity to have a relationship with each other, and which is communicably connected to terminals of the plurality of users, the relationship support apparatus including: receiving means for receiving identification information of a desired relationship partner user, with whom a relationship-seeking user seeking a relationship desires to have a relationship, sent from the terminal of the relationship-seeking user, and further receiving identification information of the relationship-seeking user, with whom the desired relationship partner user desires to have a relationship, sent from the terminal of the desired relationship partner user; determination means for determining, based on the identification information of the relationship-seeking user and the identification information of the desired relationship partner user that have been obtained through the receiving means, whether or not an agreement has been reached on the relationship between the relationship-seeking user and the desired relationship partner user; and suspension means for suspending, based on a result of the determining performed by the determination means, the relationship-seeking user and the desired relationship partner user from carrying out a relationship-seeking activity with respect to another user.

Further, the present invention provides a relationship support method of registering information of a plurality of relationship-seeking users who seek a relationship and supporting the plurality of relationship-seeking users in seeking an opportunity to have a relationship with each other, the relationship support method including: receiving identification information of a desired relationship partner user, with whom a relationship-seeking user seeking a relationship desires to have a relationship, from a terminal of the relationship-seeking user; receiving identification information of the relationship-seeking user, with whom the desired relationship partner user desires to have a relationship, from a terminal of the desired relationship partner user; determining, based on the identification information of the relationship-seeking user and the identification information of the desired relationship partner user, whether or not an agreement has been reached on the relationship between the relationship-seeking user and the desired relationship partner user; and suspending, based on a result of the determining, the relationship-seeking user and the desired relationship partner user from carrying out a relationship-seeking activity with respect to another user.

Further, the present invention provides a computer-readable storage medium having a program stored therein, the program causing a computer to function as a relationship support apparatus, in which information of a plurality of users looking for a relationship partner is registered, which supports the plurality of users in seeking an opportunity to have a relationship with each other, and which is communicably connected to terminals of the plurality of users, the program further causing the computer to function as: receiving means for receiving identification information of a desired relationship partner user, with whom a relationship-seeking user seeking a relationship desires to have a relationship, sent from the terminal of the relationship-seeking user, and further receiving identification information of the relationship-seeking user, with whom the desired relationship partner user desires to have a relationship, sent from the terminal of the desired relationship partner user; determination means for determining, based on the identification information of the relationship-seeking user and the identification information of the desired relationship partner user that have been obtained through the receiving means, whether or not an agreement has been reached on the relationship between the relationship-seeking user and the desired relationship partner user; and suspension means for suspending, based on a result of the determining performed by the determination means, the relationship-seeking user and the desired relationship partner user from carrying out a relationship-seeking activity with respect to another user.

According to the exemplary embodiment of the present invention, it is determined whether or not the agreement has been reached on the relationship based on the identification information of the desired relationship partner user specified by the relationship-seeking user and the identification information of the relationship-seeking user specified by the desired relationship partner user, and based on the result of the determination, the relationship-seeking user and the desired relationship partner user are suspended from carrying out the relationship-seeking activity with respect to another user. With this configuration, according to the exemplary embodiment of the present invention, it is possible to prevent the user from inconsistently applying for relationships.

According to one aspect of the present invention, a mode of enabling the relationship-seeking activity to be carried out is defined as an active mode and a mode of disabling the relationship-seeking activity from being carried out is defined as a suspended mode, the receiving means receives an input of a change request to change the suspended mode to the active mode from at least one of the terminal of the relationship-seeking user and the terminal of the desired relationship partner user in the case the relationship-seeking user and the desired relationship partner user are in the suspended mode, and the suspension means changes the relationship-seeking user and the desired relationship partner user from the suspended mode to the active mode based on the change request that has been obtained through the receiving means.

Further, according to one aspect of the present invention, a mode of enabling the relationship-seeking activity to be carried out is defined as an active mode and a mode of disabling the relationship-seeking activity from being carried out is defined as a suspended mode, the receiving means receives an input of a change request to change the active mode to the suspended mode from the terminal of the relationship-seeking user along with the identification information of the desired relationship partner user, and further receives an input of the change request to change the active mode to the suspended mode from the terminal of the desired relationship partner user along with the identification information of the relationship-seeking user, the suspension means changes status of the relationship-seeking user and the desired relationship partner user from the active mode to the suspended mode based on the change requests that have been obtained through the receiving means, and the determination means determines, based on the identification information of the relationship-seeking user and the identification information of the desired relationship partner user, whether or not the agreement has been reached on the relationship between the relationship-seeking user and the desired relationship partner user, and notifies the relationship-seeking user and the desired relationship partner user of a result of the determining.

In this aspect, there may take such a structure that, while the relationship-seeking user and the desired relationship partner user are in the suspended mode, the receiving means receives an input of a change request to change the suspended mode to the active mode from one of the terminal of the relationship-seeking user and the terminal of the desired relationship partner user, and the suspension means changes one of the relationship-seeking user and the desired relationship partner user from the suspended mode to the active mode based on the change request that has been obtained through the receiving means, and notifies another one of the relationship-seeking user and the desired relationship partner user of the change to the active mode.

BRIEF DESCRIPTION OF THE DRAWINGS

In the accompanying drawings:

FIG. 5 is a diagram illustrating an example of user management data;

FIG. 7 is a diagram illustrating an example of the user management data;

FIG. 8 is a flowchart illustrating an example of the flow of the mode changing processing performed by the relationship support system according to this embodiment; and FIG. 9 is a flowchart illustrating another example of the flow of the mode changing processing performed by the relationship support system according to this embodiment.

DETAILED DESCRIPTION OF THE INVENTION

Hereinafter, one embodiment of the present invention is described in detail with reference to the accompanying drawings.

Figure 1:
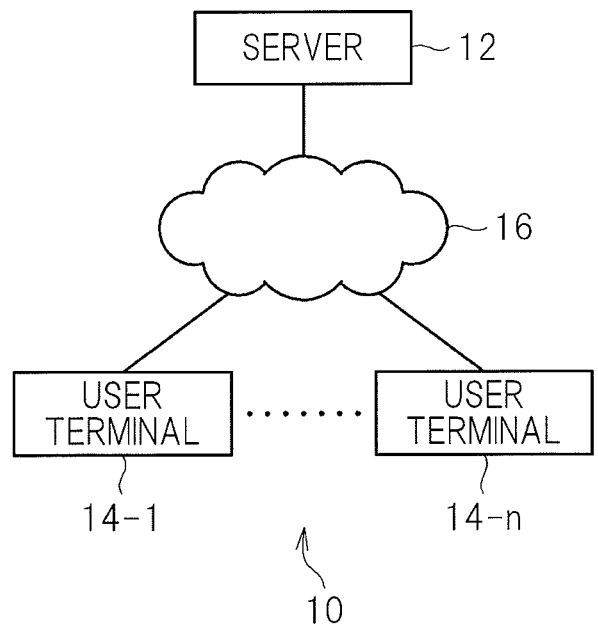
FIG. 1 is a diagram illustrating an example of a configuration of a relationship support system according to an embodiment of the present invention.

FIG. 1 is a diagram illustrating an example of a configuration of a relationship support system 10 according to this embodiment. As illustrated in FIG. 1, the relationship support system 10 according to this embodiment includes, for example, a server 12 (functioning as a relationship support apparatus in this embodiment) and user terminals 14 (14-1 to 14-n). The server 12 and the respective user terminals 14 are connected to a network 16 such as the Internet so as to be able to communicate with one another.

The server 12 is, for example, a Web application server including a control unit being a program control device such as a CPU that operates according to a program installed on the server 12, a storage unit including memory devices such as a ROM and a RAM and a hard disk drive, and a communication unit being a communication interface such as a network board. Those components are connected to one another via a bus. The storage unit of the server 12 stores a program executed by the control unit of the server 12. Further, the storage unit of the server 12 operates as a work memory of the server 12.

The user terminal 14 is, for example, a known personal computer including a control unit such as a CPU, a storage unit including memory devices such as a ROM and a RAM and a hard disk drive, an output device such as a display, an input device such as a mouse and a keyboard, and a communication unit such as a network board. Further, on the user terminal 14 according to this embodiment, a Web browser and an electronic mail client are preinstalled, and those application programs are executed. The user terminal 14 receives various services provided by the server 12 through the Web browser, and receives electronic mail transmitted from the server 12 through the electronic mail client.

In this embodiment, after the user terminal 14 accesses the server 12 through the Web browser and inputs a user ID and a password that are described later, when the user terminal 14 accesses a predetermined URL, a screen corresponding to the predetermined URL is displayed on the display of the user terminal 14. Note that, after the user ID and the password are input, the server 12 can identify the user ID of a user who uses the user terminal 14 with reference to, for example, a cookie.

The relationship support system 10 according to this embodiment is, for example, a system used in a relationship support business for supporting men and women in seeking a relationship therebetween. Information related to users looking for a relationship partner is registered in the relationship support system 10. When the user transmits a request to output a page corresponding to the relationship partner from the user terminal 14 to the server 12, a profile screen 20 regarding the relationship partner exemplified in FIG. 2 is output to the user terminal 14 through the Web browser.

Figure 2:
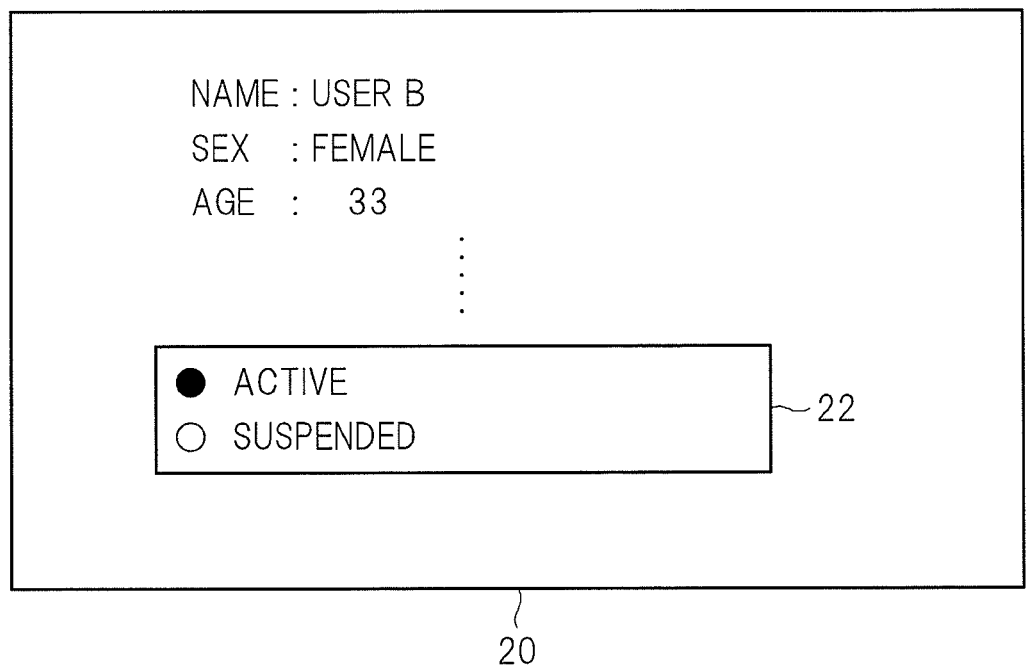
FIG. 2 is a diagram illustrating an example of a user profile screen.

As illustrated in FIG. 2, the profile screen 20 includes a user's name (or nickname), sex, age, and etc. Further, the profile screen 20 includes a mode display area 22. The mode display area 22 indicates whether the user is currently performing a relationship-seeking activity or is in a suspended condition.

Figure 3A:
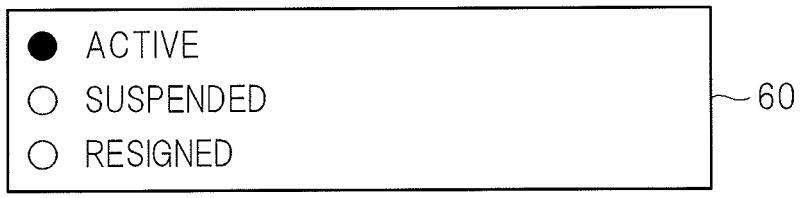
FIG. 3A is a diagram illustrating an example of a mode setting screen.
Figure 3B:
FIG. 3B is a diagram illustrating an example of the mode setting screen.

Setting contents displayed in the mode display area 22 are set on a mode setting screen 60 illustrated in FIGS. 3A and 3B. Items "active", "suspended", and "resigned" are displayed in the mode setting screen 60 along with a radio button for each item. When the radio button for "active" is specified, the user becomes able to carryout the relationship-seeking activity. When the radio button for "suspended" is specified along with the user ID of a desired relationship partner, the user suspends the relationship-seeking activity. When the radio button for "resigned" is specified, the user resigns from the service. After the resignation, personal information including the user's name and sex is deleted.

In this example, FIG. 3A illustrates a state in which the radio button for "active" is set. From this state, as illustrated in FIG. 3B, when the radio button for "suspended" is specified along with the user ID (No. 1000) of a desired relationship partner, the user suspends the relationship-seeking activity.

Figure 4:
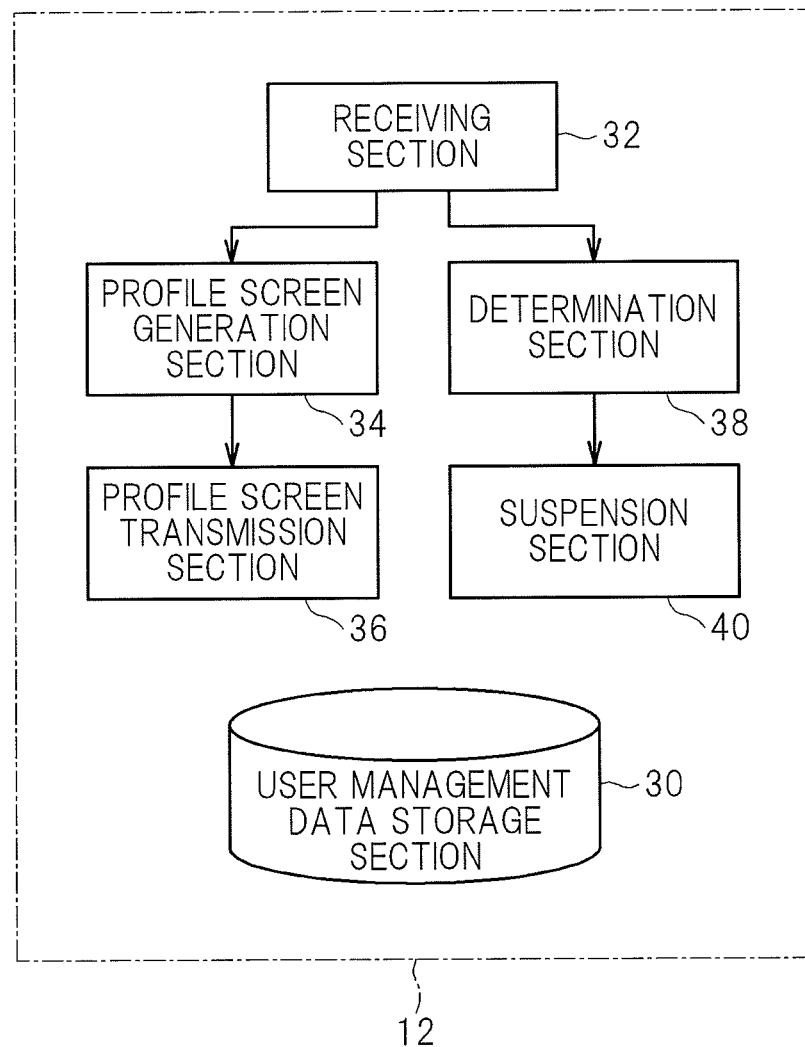
FIG. 4 is a functional block diagram illustrating an example of functions implemented by a server according to this embodiment.

FIG. 4 is a functional block diagram illustrating an example of functions implemented by the server 12 according to this embodiment. As exemplified in FIG. 4, the server 12 includes a user management data storage section 30, an receiving section 32, a profile screen generation section 34, a profile screen transmission section 36, a determination section 38, and a suspension section 40. The user management data storage section 30 is implemented mainly by the storage unit of the server 12. The other components are implemented mainly by the control unit of the server 12.

Those components are implemented by the control unit of the server 12 executing the program installed in the server 12 being a computer. Note that, this program is supplied to the server 12, for example, via a computer-readable storage medium such as a CD-ROM or a DVD-ROM or via a communication network such as the Internet.

The user management data storage section 30 prestores a plurality of records of user management data 50 exemplified in FIG. 5 for managing a plurality of relationship-seeking users who seek a relationship with another user. The user management data 50 includes, for example, the user ID being an identifier of the relationship-seeking user, name data indicating the name (or nickname) of the relationship-seeking user, sex data indicating the sex of the relationship-seeking user, age data indicating the age of the relationship-seeking user, address data indicating an address of the relationship-seeking user, telephone number data indicating a telephone number of the relationship-seeking user, e-mail address data indicating an e-mail address of the relationship-seeking user, relationship-seeking activity mode data indicating a condition of the relationship-seeking activity performed by the relationship-seeking user, a desired relationship partner user ID being the user ID of the relationship-seeking user registered as the relationship partner by the relationship-seeking user, and etc.

In this embodiment, for example, with regard to values of the relationship-seeking activity mode data, a condition in which the relationship-seeking user is performing the relationship-seeking activity is indicated by the value "active" of the relationship-seeking activity mode data, a condition in which the relationship-seeking user has suspended the relationship-seeking activity is indicated by the value "suspended" of the relationship-seeking activity mode data, and a condition in which the relationship-seeking user has resigned from the service of the relationship support business provided by a business entity is indicated by the value "resigned" of the relationship-seeking activity mode data. Immediately after or a fixed period of time after the user resigns, the user management data 50 on the user is deleted. It is assumed that the relationship-seeking activity mode data having the value "active" is referred to as "the user being in an active mode", and that the relationship-seeking activity mode data having the value "suspended" is referred to as "the user being in a suspended mode".

As exemplified in FIG. 5, in the relationship support system 10 according to this embodiment, a user A, a user B, and a user C are registered as the relationship-seeking users. Further, in this embodiment, the value of the user ID corresponding to the user A is "0001", the value of the user ID corresponding to the user B is "0002", and the value of the user ID corresponding to the user C is "0003".

The receiving section 32 receives an input of data from the user terminal 14.

In response to a generation request for the profile screen 20 associated with the user ID received from the user terminal 14 by the receiving section 32, the profile screen generation section 34 generates the profile screen 20 including the name (nickname) indicated by the name data, the sex indicated by the sex data, and the age indicated by the age data that are included in the user management data 50 corresponding to the user ID. For example, the personal information that can identify an individual (such as the real name and telephone number) is not displayed on the profile screen 20. Further, within the mode display area 22, the profile screen generation section 34 explicitly displays "active" or "suspended" corresponding to the mode indicated by the relationship-seeking activity mode data included in the user management data 50.

The profile screen transmission section 36 transmits data corresponding to the profile screen 20 to the user terminal 14 from which the generation request for the profile screen 20 has been received. Then, the user terminal 14 outputs the profile screen 20 to the display.

As described above, the user is able to know the profile and relationship-seeking activity mode of another user. Note that, the mode display area 22 may be excluded from the profile screen 20.

Figure 6:
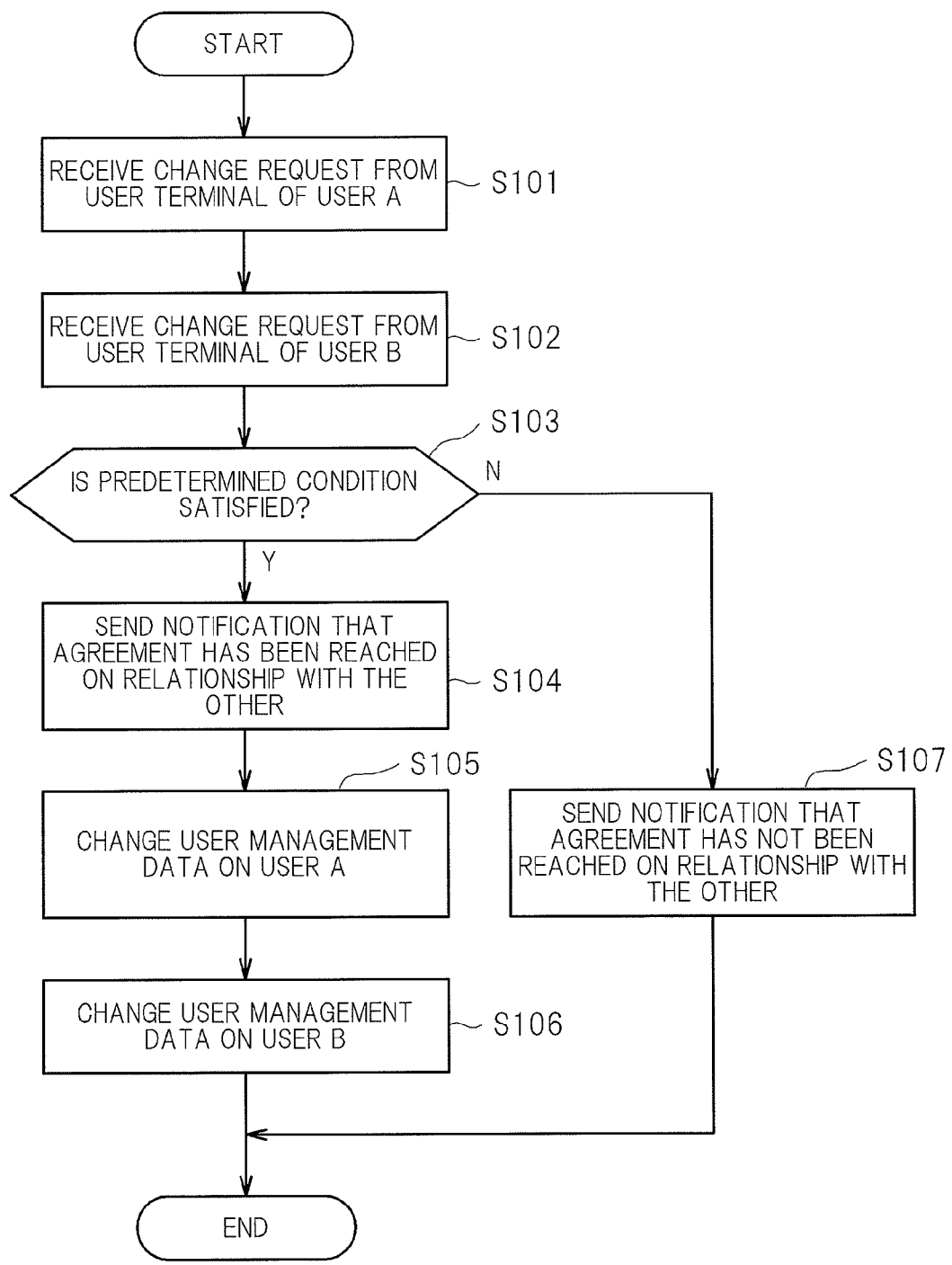
FIG. 6 is a flowchart illustrating an example of a flow of mode changing processing performed by the relationship support system according to this embodiment.

Here, the flowchart illustrated in FIG. 6 is referenced to describe an example of a flow of mode changing processing performed by the relationship support system. 10 according to this embodiment. The description of the following processing example is directed to a scene in which the user A and the user B have already agreed on starting a relationship therebetween by use of an electronic bulletin board system or the like and applications for suspension of the relationship-seeking activity are accordingly received from the user A and the user B. Further, the user A and the user B are both in the active mode at the start of this processing example.

First, the receiving section 32 receives, from the user terminal 14 used by the user A, the input of a request to change the relationship-seeking activity mode from "active" to "suspended" along with the input of the user ID "0002" of the user B being the user specified as the relationship partner (desired relationship partner user) (S101). In addition, the receiving section 32 receives, from the user terminal 14 used by the user B, the input of a request to change the relationship-seeking activity mode from "active" to "suspended" along with the input of the user ID "0001" of the user A being a desired relationship partner user of the user B (S102). Then, the determination section 38 determines whether or not the data received in the processing of Steps S101 and S102 satisfies a predetermined condition (S103). In this processing example, it is determined whether all the three conditions that: (1) the request to change the relationship-seeking activity mode to "suspended" has been received from the user terminal 14 used by the user A; (2) the request to change the relationship-seeking activity mode to "suspended" has been received from the user terminal 14 used by the user B; and (3) the user corresponding to the user ID "0001" sent from the user terminal 14 used by the user B that is the user corresponding to the user ID "0002" sent from the user terminal 14 used by the user A (desired relationship partner user specified as the relationship partner by the user A) is the user A, are satisfied or not (that is, or at least one of the conditions is not satisfied).

Then, if it is confirmed in the processing of Step S103 that the above-mentioned conditions are satisfied (S103: Y), the determination section 38 notifies the user terminal 14 used by the user A and the user terminal 14 used by the user B that the relationship with each other has been agreed on in the form of electronic mail (S104). Then, the suspension section 40 changes the value of the relationship-seeking activity mode data included in the user management data 50 on the user A from "active" to "suspended", and sets the user ID "0002" of the user B as the value of the desired relationship partner user ID included in the user management data 50 on the user A (S105). Then, the suspension section 40 changes the value of the relationship-seeking activity mode data included in the user management data 50 on the user B from "active" to "suspended", and sets the user ID "0001" of the user A as the value of the desired relationship partner user ID included in the user management data 50 on the user B (S106). Then, the processing illustrated in this processing example is brought to an end. FIG. 7 illustrates an example of the user management data 50 used after this processing.

If it is confirmed in the processing of Step S103 that at least one of the above-mentioned conditions is not satisfied (S103: N), the determination section 38 notifies the user terminal 14 of the user B that the relationship with each other has not been agreed on in the form of electronic mail (S107), and ends the processing illustrated in this processing example.

Here, the flowchart illustrated in FIG. 8 is referenced to describe an example of the flow of the mode changing processing performed by the relationship support system 10 according to this embodiment when the input of the request to change the relationship-seeking activity mode to the active mode is received from the user A after the end of the processing of Steps S101 to S107. The user A and the user B are both in the suspended mode at the start of this processing example.

First, the receiving section 32 receives, from the user terminal 14 used by the user A, the input of a request to change the relationship-seeking activity mode from "suspended" to "active" (S201). In response thereto, the suspension section 40 changes the value of the relationship-seeking activity mode data included in the user management data 50 on the user A from "suspended" to "active" (S202). Then, the suspension section 40 changes the value of the relationship-seeking activity mode data included in the user management data 50 on the user B that is the user corresponding to the value "0002" of the desired relationship partner user ID included in the user management data 50 on the user A, from "suspended" to "active" (S203). Then, the suspension section 40 deletes the value of the desired relationship partner user ID included in the user management data 50 on the user A and the value of the desired relationship partner user ID included in the user management data 50 on the user B (S204). Then, the processing illustrated in this processing example is brought to an end.

Note that, in the above-mentioned processing example, after the end of the processing of Step S204, the suspension section 40 may notify the user terminal 14 of the user B that the relationship-seeking activity mode of the user A has been changed to the active mode in the form of electronic mail.

Next, the flowchart illustrated in FIG. 9 is referenced to describe another example of the flow of the mode changing processing performed by the relationship support system 10 according to this embodiment. In this example, after the mode has been changed in response to the request to change the mode, the users are notified of whether or not the relationship with each other has been agreed on. Note that, detailed description of the same processing as the flow illustrated in FIG. 6 is omitted. The description of the following processing example is directed to the scene in which the user A and the user B have already agreed on starting the relationship therebetween by use of the electronic bulletin board system or the like and applications for suspension of the relationship-seeking activity are accordingly received from the user A and the user B. Further, the user A and the user B are both in the active mode at the start of this processing example.

First, the receiving section 32 receives, from the user terminal 14 used by the user A, the input of a request to change the relationship-seeking activity mode from "active" to "suspended" along with the input of the user ID "0002" of the user B being the user specified as the relationship partner (desired relationship partner user) (S301). Then, the suspension section 40 changes the value of the relationship-seeking activity mode data included in the user management data 50 on the user A from "active" to "suspended", and sets the user ID "0002" of the user B as the value of the desired relationship partner user ID included in the user management data 50 on the user A (S302).

Subsequently, the receiving section 32 receives, from the user terminal 14 used by the user B, the input of a request to change the relationship-seeking activity mode from "active" to "suspended" along with the input of the user ID "0001" of the user A being the desired relationship partner user of the user B (S303). Then, the suspension section 40 changes the value of the relationship-seeking activity mode data included in the user management data 50 on the user B from "active" to "suspended", and sets the user ID "0001" of the user A as the value of the desired relationship partner user ID included in the user management data 50 on the user B (S304).

Subsequently, the determination section 38 determines whether or not the data received in the processing of Steps S301 and S303 satisfies a predetermined condition (S305). In this processing example, it is determined whether all the three conditions that: (1) the request to change the relationship-seeking activity mode to "suspended" has been received from the user terminal 14 used by the user A; (2) the request to change the relationship-seeking activity mode to "suspended" has been received from the user terminal 14 used by the user B; and (3) the user corresponding to the user ID "0001" sent from the user terminal 14 used by the user B that is the user corresponding to the user ID "0002" sent from the user terminal 14 used by the user A (desired relationship partner user specified as the relationship partner by the user A) is the user A, are satisfied or not (that is, or at least one of the conditions is not satisfied).

Subsequently, if it is confirmed in the processing of Step S305 that the above-mentioned conditions are satisfied (S305: Y), the determination section 38 notifies the user terminal 14 used by the user A and the user terminal 14 used by the user B that the relationship with each other has been agreed on in the form of electronic mail (S306).

If it is confirmed in the processing of Step S305 that at least one of the above-mentioned conditions is not satisfied (S305: N), the determination section 38 notifies the user terminal 14 of the user B that the relationship with each other has not been agreed on in the form of electronic mail (S307), and ends the processing illustrated in this processing example. As described above, the server 12 may notify the users of whether or not the relationship with each other has been agreed on after the mode has been changed in response to the request to change the mode.

Further, in the relationship support system 10 according to this embodiment, when the request to change the relationship-seeking activity mode to the active mode is received from the user A after the end of the processing of Steps S301 to S307, the mode changing processing for changing the relationship-seeking activity modes of the user A and the user B from the suspended mode to the active mode may be executed in the same manner as the processing of Steps S201 to S204. Further, after the end of the above-mentioned mode changing processing, the suspension section 40 may notify the user terminal 14 of the user B that the relationship-seeking activity mode of the user A has been changed to the active mode in the form of electronic mail.

In the relationship support system 10 according to this embodiment, if the receiving section 32 receives, from the user terminal 14 used by the user in the suspended mode, the input of an application for a relationship with another user performed after retrieval of the profile screen 20 regarding a relationship partner, the determination section 38 notifies the user terminal 14 that the application for the relationship is rejected. As described above, the relationship support system 10 according to this embodiment is configured to inhibit the user in the suspended mode from applying for a relationship with another user. Further, the user terminal 14 used by the user in the suspended mode may be inhibited from retrieving the profile screen 20 regarding a relationship partner.

In the relationship support system 10 according to this embodiment, when the receiving section 32 receives the input of the request to change the relationship-seeking activity mode to the active mode from the user terminal 14 used by the user in the suspended mode (for example, user A), the suspension section 40 changes the value of the relationship-seeking activity mode data on the user in the suspended mode to "active", and notifies the user being the relationship partner of the user A (for example, user B) that the relationship-seeking activity mode of the user A has been changed to the active mode.

In the relationship support system 10 according to this embodiment, the user can confirm whether or not the relationship-seeking activity mode of the other user with whom the relationship has been agreed on has been positively changed from the active mode to the suspended mode. Accordingly, the relationship support system 10 according to this embodiment can prevent such an unfaithful behavior as to keep from changing the relationship-seeking activity mode to "suspended" regardless of the agreement on the relationship with another user.

Note that, the present invention is not limited to the above-mentioned embodiment.

For example, at predetermined time intervals, the determination section 38 may monitor the value of the relationship-seeking activity mode data on the user B specified by the user A as the desired relationship partner user. Further, if the relationship-seeking activity mode of the user B has not been changed to the suspended mode, the determination section 38 may notify at least one of the user terminal 14 of the user A and the user terminal 14 of the user B to that effect.

Further, for example, when the application for the relationship with the user B is received from the user terminal 14 used by the user A, the determination section 38 may send a prompt notification to change the relationship-seeking activity mode data to the user terminal 14 used by the user B.

Further, for example, when the determination section 38 receives the application for the relationship with the user B from the user terminal 14 used by the user A, receives the application for the relationship with the user B from the user terminal 14 used by the user C, and receives the application for the relationship with the user A from the user terminal 14 used by the user B, the determination section 38 may notify the user terminal 14 used by the user A and the user terminal 14 used by the user B that the agreement has been reached on the relationship between the user A and the user B and notify the user terminal 14 used by the user C that the agreement has not been reached on the relationship between the user B and the user C.

Further, for example, the relationship support system 10 may be configured to keep from providing part of functions to the user in the suspended mode. Further, the roles of the server 12 and the user terminal 14 played in the relationship support system 10 are not limited to the above-mentioned embodiment. Further, the server 12 may be constituted of one housing or a plurality of housings. Further, specific numerical values and character strings used in the above description and in the accompanying drawings are mere examples, and the present invention is not limited to those numerical values or character strings.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A relationship support apparatus, in which information of a plurality of users looking for a relationship partner is registered, which supports the plurality of users in seeking an opportunity to have a relationship with each other, and which is communicably connected to terminals of the plurality of users, the relationship support apparatus comprising:

a receiving unit that receives, from a terminal of a first relationship-seeking user, identification information of a desired relationship partner user, with whom the first relationship-seeking user desires to have a relationship, and further receives, from a terminal of the desired relationship partner user, identification information of a second relationship-seeking user, with whom the desired relationship partner user desires to have a relationship;

a determination unit that determines, based on the identification information of the desired relationship partner user and the identification information of the second relationship-seeking user that have been obtained through the receiving unit, whether or not an agreement has been reached on the relationship between the first relationship-seeking user and the desired relationship partner user; and a suspension unit that, when the determination unit determines that the agreement has been reached on the relationship between the first relationship-seeking user and the desired relationship partner user, suspends the first relationship-seeking user and the desired relationship partner user from carrying out a relationship-seeking activity with respect to other users, wherein:
a mode of enabling the relationship-seeking activity to be carried out is defined as an active mode and a mode of disabling the relationship-seeking activity from being carried out is defined as a suspended mode, and when a status of the first relationship-seeking user and a status of the desired relationship partner are in the suspended mode, the suspension unit prevents the first relationship-seeking user and the desired relationship partner from retrieving and viewing profiles of the other users and from contacting the other users.

2. The relationship support apparatus according to claim 1, wherein:
when the status of the first relationship-seeking user and the status of the desired relationship partner are in the suspended mode, upon receipt by the receiving unit of a change request to change the suspended mode to the active mode from at least one of the terminal of the first relationship-seeking user and the terminal of the desired relationship partner user, the suspension unit changes the status of the first relationship-seeking user and the status of the desired relationship partner user from the suspended mode to the active mode based on the change request that has been obtained through the receiving unit.

3. The relationship support apparatus according to claim 1, wherein:
when (i) the first relationship-seeking user and the desired relationship partner are in the active mode, (ii) the receiving unit receives a change request to change the active mode to the suspended mode from the terminal of the first relationship-seeking user along with the identification information of the desired relationship partner user, (iii) the receiving unit receives a change request to change the active mode to the suspended mode from the terminal of the desired relationship partner user along with the identification information of the second relationship-seeking user, and (iv) the determination unit determines that the second relationship-seeking user is the first relationship-seeking user, then:

the suspension unit changes the status of the first relationship-seeking user and the status of the desired relationship partner user from the active mode to the suspended mode; and the determination unit notifies the first relationship-seeking user and the desired relationship partner user that the agreement has been reached on the relationship between the first relationship-seeking user and the desired relationship partner user.

4. The relationship support apparatus according to claim 3, wherein:
while the status of the first relationship-seeking user and the status of the desired relationship partner user are in the suspended mode, when the receiving unit receives a change request to change the suspended mode to the active mode from one of the terminal of the first relationship-seeking user and the terminal of the desired relationship partner user, the suspension unit changes the status of one of the first relationship-seeking user and the desired relationship partner user from the suspended mode to the active mode based on the change request and notifies another one of the first relationship-seeking user and the desired relationship partner user of the change of the status to the active mode.

5. A relationship support method of registering information of a plurality of relationship-seeking users who seek a relationship and supporting the plurality of relationship-seeking users in seeking an opportunity to have a relationship with each other, the relationship support method comprising:

receiving, from a terminal of a first relationship-seeking user, identification information of a desired relationship partner user, with whom the first relationship-seeking user desires to have a relationship;

receiving, from a terminal of the desired relationship partner user, identification information of a second relationship-seeking user, with whom the desired relationship partner user desires to have a relationship;

determining, based on the identification information of the desired relationship partner user and the identification information of the second relationship-seeking user, whether or not an agreement has been reached on the relationship between the first relationship-seeking user and the desired relationship partner user; and when the determining determines that the agreement has been reached on the relationship between the first relationship-seeking user and the desired relationship partner user, suspending the first relationship-seeking user and the desired relationship partner user from carrying out a relationship-seeking activity with respect to other users, wherein:
a mode of enabling the relationship-seeking activity to be carried out is defined as an active mode and a mode of disabling the relationship-seeking activity from being carried out is defined as a suspended mode, and when a status of the first relationship-seeking user and a status of the desired relationship partner are in the suspended mode, the first relationship-seeking user and the desired relationship partner are prevented from retrieving and viewing profiles of the other users and prevented from contacting the other users.

6. A non-transitory computer-readable storage medium having a program stored therein, the program causing a computer to function as a relationship support apparatus, in which information of a plurality of users looking for a relationship partner is registered, which supports the plurality of users in seeking an opportunity to have a relationship with each other, and which is communicably connected to terminals of the plurality of users, the program further causing the computer to function as:

a receiving unit that receives, from a terminal of a first relationship-seeking user, identification information of a desired relationship partner user, with whom the first relationship-seeking user desires to have a relationship, and further receives, from a terminal of the desired relationship partner user, identification information of a second relationship-seeking user, with whom the desired relationship partner user desires to have a relationship;

a determination unit that determines, based on the identification information of the desired relationship partner user and the identification information of the second relationship-seeking user that have been obtained through the receiving unit, whether or not an agreement has been reached on the relationship between the first relationship-seeking user and the desired relationship partner user; and a suspension unit that, when the determination unit determines that the agreement has been reached on the relationship between the first relationship-seeking user and the desired relationship partner user, suspends the first relationship-seeking user and the desired relationship partner user from carrying out a relationship-seeking activity with respect to other users, wherein:

a mode of enabling the relationship-seeking activity to be carried out is defined as an active mode and a mode of disabling the relationship-seeking activity from being carried out is defined as a suspended mode, and when a status of the first relationship-seeking user and a status of the desired relationship partner are in the suspended mode, the suspension unit prevents the first relationship-seeking user and the desired relationship partner from retrieving and viewing profiles of the other users and from contacting the other users.

7. The relationship support apparatus according to claim 1, wherein:

when the agreement is reached on the relationship between the first relationship-seeking user and the desired relationship partner user and the mode of the desired relationship partner user is not changed to the suspended mode during a predetermined period, the determination unit notifies at least one of the first relationship-seeking user and the desired relationship partner user.

\* \* \* \* \*